F. E. Rogers.
Harvester Cutter.
Nº 104773.     Patented Jun. 28, 1870.
Fig. 1.
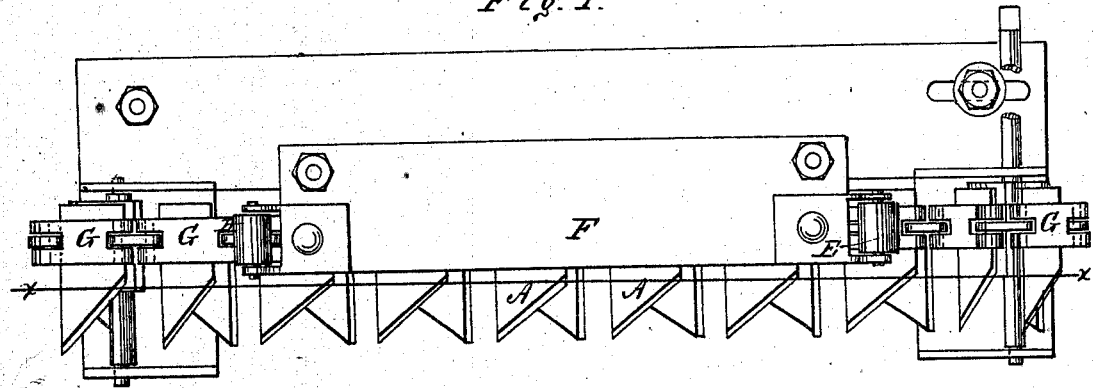
Fig. 2.
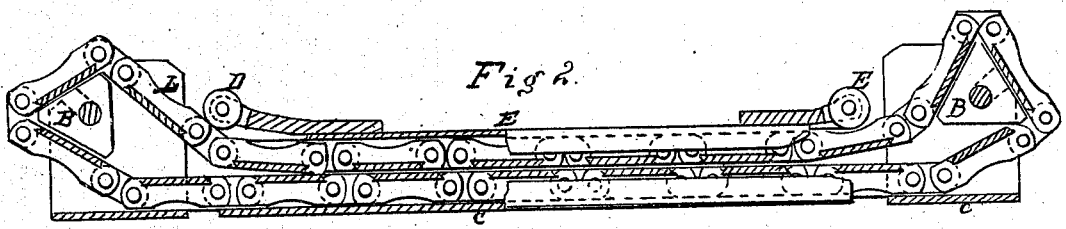
Fig. 3.    Fig. 4.    Fig. 5.    Fig. 6.
 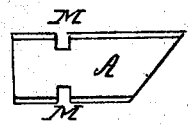  
Witnesses                Inventor

UNITED STATES PATENT OFFICE.

FRANCIS E. ROGERS, OF PAW PAW, ILLINOIS.

IMPROVEMENT IN HARVESTER-CUTTERS.

Specification forming part of Letters Patent No. 104,773, dated June 28, 1870.

*To all whom it may concern:*

Be it known that I, FRANCIS E. ROGERS, of Paw Paw, in the county of Lee and State of Illinois, have invented a new and useful Improvement in Mowing and Reaping Machines; and I do hereby declare that the following is full, clear, and exact description thereof, which will enable others skilled in the art to make and use the same, reference being had to the accompanying drawings, forming part of this specification.

My invention relates to that class of mowers and reapers wherein the knives are carried on an endless chain; and consists in certain improvements thereon, to be more particularly specified hereinafter.

Figure 1 represents a plan view of my improved sickle device. Fig. 2 represents a section of the same, taken on the line $x\ x$ of Fig. 1. Fig. 3 represents an elevation of one of the chain-sections. Fig. 4 represents a plan view of one of the sickle-sections or cutters. Fig. 5 represents an elevation of one of the chain-section connecting-links. Fig. 6 represents a view of a connecting-pin.

Similar letters of reference indicate corresponding parts.

I propose to connect the cutters A to an endless chain or carrier having a continuous motion over chain-carrying wheels B, at each end of the cutter-supporting bar, one of which is a driver and arranged to be rotated from any suitable revolving wheels, deriving motion from the truck-wheels. The lower part of the chain moves along the upper surface of the cutter-supporting bar C, so arranged that the cutting-edges of the cutters project in advance of it, and the upper part of the chain is made to turn downward after passing over the pulley by a guide-roller, D, so that the cutters thereof will be carried along the upper faces of those below, and at the other end, where the chain rises to pass over the other pulley, a similar guide-pulley, E, is placed, and between these a guide-plate, F.

As the cutters have a continuous forward movement, they are provided with only one cutting-edge, running diagonally from side to side, which, going out at the bottom and back at the top, act together to make a shear cut.

These cutters are fitted by dovetailing to chain-sections G, slotted and bored at the ends for fitting the connecting-links H, which fit into the slots in the ends of the said links, and are connected by pins K.

These pins are larger at each end than at the center, and the pin-holes in the links are elongated and enlarged at the ends, near the center of said links, so that the pins can neither pass in or out, except when the enlarged parts of the holes in the links are adjusted to the proper position relatively to the holes in the sections, and this adjustment can only be done when the links stand at right angles to the sections, so that a ready means of connection or disconnection of the sections is provided, which cannot become disconnected when the chain is in place on the chain-wheels, the projecting ends of the links fitting into the slots of the sections.

The sections G of the chain are grooved or curved in the back, as shown at L, to permit them to pass under the rollers D E.

This method of connecting the links avoids the necessity for using bolts and nuts, or other devices, liable to work out, or which cause delay in changing.

The sickles or cutters are held in the dovetailed grooves by the ends of the connecting-links, which project into notches M in the sides of the cutters, which, when the cutters are in position, coincide with the slots in the ends of the sections G.

Having thus described my invention, what I claim as new, and desire to secure by Letters Patent, is—

The chain-sections G, links I, pins K, and cutters A, all combined and arranged substantially as specified.

FRANCIS E. ROGERS.

Witnesses:
JOHN COLVILL,
JAMES H. THOMPSON.